DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1366

T889,020
BINDER MATERIALS FOR PHOTOCONDUCTIVE LAYERS CONTAINING BLENDS OF RESINS

Oris L. Stanton, 1669 Lake Ave., Rochester, N.Y. 14650

Filed Oct. 6, 1970, Ser. No. 78,578
Int. Cl. G03g *5/04*
U.S. Cl. 96—1.5
No Drawing. 18 Pages Specification

The electrical contrast of electrophotographic elements is lowered while keeping speed reasonably high by using novel blends of resins as binder materials for organic or inorganic photoconductors in the photoconductive layers of the electrophotographic elements. The blends comprise a polycarbonate, polyester or polystyrene resin with a polymer which causes reduction of the electrical contrast of the photoconductive layer. The latter polymer can be (a) an alkylated styrene polymer having a softening point from about 100–150° C., or (b) a β-pinene polymer having a softening point around 100° C. or (c) a terpene-phenol copolymer having a softening point around 100° C. An example is a composition containing (a) 150 parts by weight of a 50/50 blend of bisphenol A polycarbonate and alkylated polystyrene of which the styrene rings have one ethyl or two methyl substituents as a binder for (b) 50 parts of the organic photoconductor phenyldibenzylamine and (c) one part of a pyrylium sensitizing dye. The mixture is coated on a subbed nickel support and used as a xerographic plate. After charging in the dark to a surface potential of about 600 volts, its gamma for a positive charge is 1.07 and the ratio of electrical H & D shoulder and toe speed is 2000/25. The use of the alkylated styrene polymer, the β-pinene polymer or the terpene-phenol copolymer for blending with other binder resins enables one to prepare photoconductive elements of a desired contrast level.